US009362560B2

(12) United States Patent
Nazri

(10) Patent No.: US 9,362,560 B2
(45) Date of Patent: Jun. 7, 2016

(54) SILICATE CATHODE FOR USE IN LITHIUM ION BATTERIES

(75) Inventor: Gholam-Abbas Nazri, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1134 days.

(21) Appl. No.: 13/409,709

(22) Filed: Mar. 1, 2012
(Under 37 CFR 1.47)

(65) Prior Publication Data

US 2012/0227252 A1    Sep. 13, 2012

Related U.S. Application Data

(60) Provisional application No. 61/450,411, filed on Mar. 8, 2011.

(51) Int. Cl.
| | |
|---|---|
| H01M 4/82 | (2006.01) |
| H01M 4/58 | (2010.01) |
| H01M 4/136 | (2010.01) |
| H01M 4/36 | (2006.01) |
| H01M 4/62 | (2006.01) |
| H01M 10/052 | (2010.01) |

(52) U.S. Cl.
CPC ............ *H01M 4/5825* (2013.01); *H01M 4/136* (2013.01); *H01M 4/366* (2013.01); *H01M 4/625* (2013.01); *H01M 10/052* (2013.01); *Y02E 60/122* (2013.01); *Y10T 29/49108* (2015.01)

(58) Field of Classification Search
CPC ..... H01M 4/52; H01M 4/5825; H01M 4/625; C01B 33/20; C01B 33/22; C01B 33/24; C01B 33/26; C01B 33/32; C01B 33/325

USPC .......................................................... 252/182.1
See application file for complete search history.

(56) References Cited

U.S. PATENT DOCUMENTS

| | | | |
|---|---|---|---|
| 3,330,697 A | 7/1967 | Pechini | |
| 4,226,636 A * | 10/1980 | Mizutani et al. | 106/470 |
| 4,234,380 A * | 11/1980 | Kihlstedt et al. | 162/152 |
| 4,391,787 A | 7/1983 | Tibbetts | |
| 4,491,569 A | 1/1985 | Tibbetts | |

(Continued)

FOREIGN PATENT DOCUMENTS

| | | |
|---|---|---|
| CN | 1534813 A | 10/2004 |
| CN | 1812934 A | 8/2006 |

(Continued)

OTHER PUBLICATIONS

Nyten et al., Electrochemical Performance of Li2FeSiO4 as a new Li-battery cathode material, Electrochemistry Communications, vol. 7, Issue 2, Feb. 2005, pp. 156-160.*

(Continued)

*Primary Examiner* — Ula C Ruddock
*Assistant Examiner* — Amanda Barrow
(74) *Attorney, Agent, or Firm* — Harness, Dickey & Pierce, P.L.C.

(57) ABSTRACT

Silicate cathodes for lithium ion batteries are provided along with methods of forming a silicate. Olivine structures are substituted with a lithium ion. The substituted Olivine structures are combined to form flake-like sheets having an orientation that facilitates passage of lithium ions. Related methods of forming a cathode are provided.

20 Claims, 3 Drawing Sheets

(56) References Cited

U.S. PATENT DOCUMENTS

| | | | |
|---|---|---|---|
| 4,497,788 A | 2/1985 | Bradley et al. | |
| 4,565,684 A | 1/1986 | Tibbetts et al. | |
| 5,024,818 A | 6/1991 | Tibbetts et al. | |
| 5,374,415 A | 12/1994 | Alig et al. | |
| 5,389,400 A | 2/1995 | Ting et al. | |
| 5,413,773 A | 5/1995 | Tibbetts et al. | |
| 5,424,126 A | 6/1995 | Tibbetts et al. | |
| 5,433,906 A | 7/1995 | Dasch et al. | |
| 5,587,257 A | 12/1996 | Tibbetts et al. | |
| 5,594,060 A | 1/1997 | Alig et al. | |
| 5,604,037 A | 2/1997 | Ting et al. | |
| 5,814,408 A | 9/1998 | Ting et al. | |
| 5,837,081 A | 11/1998 | Ting et al. | |
| 5,846,509 A | 12/1998 | Alig et al. | |
| 5,853,865 A | 12/1998 | McHugh et al. | |
| 5,882,624 A * | 3/1999 | Kuznicki | C01B 39/085 204/291 |
| 6,156,256 A | 12/2000 | Kennel | |
| 6,506,355 B1 | 1/2003 | Glasgow et al. | |
| 6,506,865 B2 | 1/2003 | Kwag et al. | |
| 6,630,015 B1 | 10/2003 | Burton et al. | |
| 6,988,304 B2 | 1/2006 | Moseley et al. | |
| 7,018,607 B2 | 3/2006 | Nazri et al. | |
| 7,297,446 B2 | 11/2007 | Fukui et al. | |
| 8,048,341 B2 | 11/2011 | Burton et al. | |
| 8,148,455 B2 | 4/2012 | Posudievsky et al. | |
| 8,586,222 B2 | 11/2013 | Timmons et al. | |
| 8,663,840 B2 | 3/2014 | Nazri et al. | |
| 8,785,054 B2 | 7/2014 | Halalay et al. | |
| 2003/0015705 A1 | 1/2003 | Chason et al. | |
| 2003/0219646 A1 | 11/2003 | LeCostaouec | |
| 2004/0191631 A1 | 9/2004 | Fukui et al. | |
| 2004/0265216 A1 | 12/2004 | Nazri et al. | |
| 2008/0261116 A1 | 10/2008 | Burton et al. | |
| 2009/0029253 A1 * | 1/2009 | Itou | H01M 4/525 429/223 |
| 2009/0047577 A1 | 2/2009 | Iwamoto et al. | |
| 2009/0117471 A1 * | 5/2009 | Grey et al. | 429/231.95 |
| 2009/0148769 A1 | 6/2009 | Volkov et al. | |
| 2009/0294736 A1 | 12/2009 | Burton et al. | |
| 2010/0055465 A1 | 3/2010 | Palmer et al. | |
| 2010/0119939 A1 | 5/2010 | Misumi et al. | |
| 2010/0140540 A1 * | 6/2010 | Yamada et al. | 252/182.1 |
| 2010/0181529 A1 * | 7/2010 | Huang et al. | 252/182.1 |
| 2010/0189991 A1 | 7/2010 | Lytle et al. | |
| 2010/0255356 A1 * | 10/2010 | Fujii et al. | 429/94 |
| 2010/0330419 A1 * | 12/2010 | Cui et al. | 429/209 |
| 2010/0330425 A1 | 12/2010 | Lopatin et al. | |
| 2010/0330430 A1 * | 12/2010 | Chung et al. | 429/224 |
| 2011/0008678 A1 * | 1/2011 | Li et al. | 429/231.8 |
| 2011/0051322 A1 | 3/2011 | Pushparaj et al. | |
| 2011/0052985 A1 * | 3/2011 | Kashiwazaki et al. | 429/217 |
| 2011/0068295 A1 * | 3/2011 | Beck et al. | 252/182.1 |
| 2011/0076596 A1 | 3/2011 | Futami et al. | |
| 2011/0151333 A1 | 6/2011 | Halalay et al. | |
| 2011/0250478 A1 | 10/2011 | Timmons et al. | |
| 2011/0274976 A1 * | 11/2011 | Blomgren et al. | 429/223 |
| 2011/0291055 A1 * | 12/2011 | Kojima et al. | 252/506 |
| 2012/0219852 A1 | 8/2012 | Huang et al. | |
| 2012/0229096 A1 | 9/2012 | Nazri | |
| 2012/0264017 A1 | 10/2012 | Nazri et al. | |
| 2012/0264020 A1 | 10/2012 | Burton et al. | |
| 2013/0234674 A1 | 9/2013 | Nazri | |

FOREIGN PATENT DOCUMENTS

| | | | |
|---|---|---|---|
| CN | 101327920 | * 12/2008 | ............. C01B 25/45 |
| CN | 101562244 A | 10/2009 | |
| CN | 101604745 | * 12/2009 | ............ H01M 10/36 |
| CN | 101604745 A | 12/2009 | |
| CN | 102214817 A | 10/2011 | |
| CN | 102738448 A | 10/2012 | |
| WO | WO 2010/089931 | * 8/2010 | ............. H01M 4/58 |

OTHER PUBLICATIONS

U.S. Appl. No. 13/409,732, filed Mar. 1, 2012, Gholam-Abbas Nazri.

J. Phys. Chem. C. 2009, 113, pp. 4712-4716, Synthesis and Electrochemical Performance of Sulfur/Highly Porous Carbon Composites, C. Lai, X. P. Gao, B. Zhang, T.Y. Yan, and Z. Zhou, published online Feb. 20, 2009.

Chinese Chemical Letters 20 (2009) pp. 1255-1258, Electrochemical performance of sulfur composite cathode materials for rechargeable lithium batteries, Feng Wu, Sheng Xian Wu, Ren Jie Chen, Shi Chen, and Guo Qing Wang.

Journal of Alloys and Compounds 449 (2008) pp. 313-316, Improvement of cycle property of sulfur electrode for lithium/sulfur battery, Young-Jin Choi, Ki-Won Kim, Hyo-Jun Ahn, Jou-Hyeon Ahn, available online Jan. 24, 2007.

Nature Materials 8 (2009) pp. 500-506, A highly ordered nanostructured carbon-sulphur cathode for lithium-sulphur batteries, Xiulei Ji, Kyu Tae Lee, and Linda F. Nazar, published online May 17, 2009.

Journal of Power Sources 195 (2010) pp. 2928-2934, Preparation of electrochemically active lithium sulfide-carbon composites using spark-plasma-sintering process, Tomonari Takeuchi, Hikari Sakaebe, Hiroyuki Kageyama, Hiroshi Senoh, Tetsuo Sakai, and Kuniaki Tatsumi, available Nov. 10, 2009.

Chem. Mater. 21, 2009, pp. 4724-4730, Hierarchically Structured Sulfur/Carbon Nanocomposite Material for High-Energy Lithium Battery, Chengdu Liang, Nancy J. Dudney, and Jane Y. Howe, published online Sep. 4, 2009.

Journal of Power Sources 195 (2010) 3684-3688, A high energy density lithium/sulfur-oxygen hybrid battery, Sheng S. Zhang, Donald Foster, and Jeffrey Read, available online Dec. 22, 2009.

Electrochimica Acta 52 (2007) pp. 2829-2840, Characterization of silicon- and carbon-based composite anodes for lithium-ion batteries, Volodymyr G. Khomenko, and Viacheslav Z. Barsukov, available online Nov. 30, 2006.

Journal of Power Sources 125 (2004) pp. 206-213, Electrochemical performance of lithium ion battery, nano-silicon-based, disordered carbon composite anodes with different microstructures, Xiang-Wu Zhang, Prashanth K. Patil, Chunsheng Wang, A. John Appleby, Frank E. Little, and David L. Cocke.

Journal of Power Sources 174 (2007) pp. 823-827, Spray-pyrolyzed silicon/disordered carbon nanocomposites for lithium-ion battery anodes, S.H. Ng, J. Wang, K. Konstantinov, D. Wexler, S.Y. Chew, Z.P. Guo, and H.K. Liu, available online Jun. 29, 2007.

Gómez-Cámer et al., Anchoring Si Nanoparticles to Carbon Nanofibers: An Efficient Procedure for Improving Si Performance in Li batteries.Nov. 2010, Journal of Materials Chemistry, 21, 811-818.

* cited by examiner

SILICATE CATHODE FOR USE IN LITHIUM ION BATTERIES

CROSS-REFERENCE TO RELATED APPLICATIONS

This application claims the benefit of U.S. Provisional Application No. 61/450,411, filed on Mar. 8, 2011. The disclosure of the above application is incorporated herein by reference in its entirety.

This application is related to U.S. patent application Ser. No. 13/409,732 filed on Mar. 1, 2012. The disclosure of the above application is incorporated herein by reference in its entirety.

FIELD

The present disclosure relates to a battery having a silicate cathode and methods of forming the silicate cathode.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The selection of battery materials includes considerations such as the desired power output for and any size limitations of the particular device incorporating the battery. With rechargeable batteries, capacity and rate capability or the rate at which the battery receives and delivers an electrical charge is also considered. In electric vehicles or other high-power applications, both the capacity and rate capability are the major priorities because of the extended range and high charge/discharge rates demanded by these applications.

With respect to lithium ion batteries, there is a loss of capacity and rate capability because after the initial charge—discharge cycles of new battery, there is an "initial cycle irreversibility" or a loss of 10 to 50% of available lithium ions. Thus, the initial cycle irreversibility decreases storage capacity of the battery for subsequent charges and discharges. To compensate for the initial cycle irreversibility and decrease in storage capacity, the battery size may be increased. As another option, alternate electrode systems may be used that modify the type of negative electrode in the system. However, these compensations and alternate electrode systems have shortcomings and provide technical barriers for commercialization of an optimized battery. In addition, there is an unacceptable rate of metal dissolution in some of the oxide positive electrodes, causing electrode degradation and limiting their applications for long term cycling.

Current lithium ion battery technology is based on low-energy-density carbonaceous or lithiated graphite negative electrodes and either oxide positive electrodes or phosphate positive electrodes. Current positive electrode materials are limited to less than one electron per transition metal, with maximum capacity between 100-200 Ah/kg in practical lithium cells. The oxide positive electrode also reacts with the electrolyte and generates oxygen at a high state of charge through an exothermic reaction, particularly at elevated temperatures, which causes an increase in cell impedance. The positive electrode decomposition impacts cell performance and may lead to battery thermal run-away. Additionally, transition metals like cobalt and nickel used in oxide positive electrodes significantly increase cost. Other options such as phosphate positive electrodes have an intrinsically large band gap and, therefore, require a specialized coating (with carbon) or doping that adds to the overall cost. In addition, most oxide cathodes suffer from dissolution of transition metals such as manganese, particularly at elevated temperatures that limits their applications.

SUMMARY

This section provides a general summary of the disclosure, and is not a comprehensive disclosure of its full scope or all of its features.

In various embodiments, the present teachings provide methods of preparing a silicate cathode for a lithium ion battery. An Olivine structure having a flake-like structure is prepared. The Olivine structure is coated with carbon. The Olivine structure is shaped for use as part of a cathode.

In still other aspects of the present teachings, methods of preparing a silicate cathode for a lithium ion battery is provided. A mixed transition metal silicate is prepared to have a flake-like structure. The mixed transition metal silicate is coated with carbon. The mixed transition metal silicate is shaped for use as part of a cathode. The mixed transition metal silicate has the general formula of $Li_2M(X)M'(1-X)SiO_4$, where M and M' are transition metals or sp metals such as magnesium, calcium, or aluminum as non-limiting examples, with various oxidation states.

In yet other embodiments of the present teachings, methods of increasing voltage in a lithium ion battery are provided by distributing lithium ions in a plurality of spaces formed between flake-like silicate materials combined to form a region of a cathode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
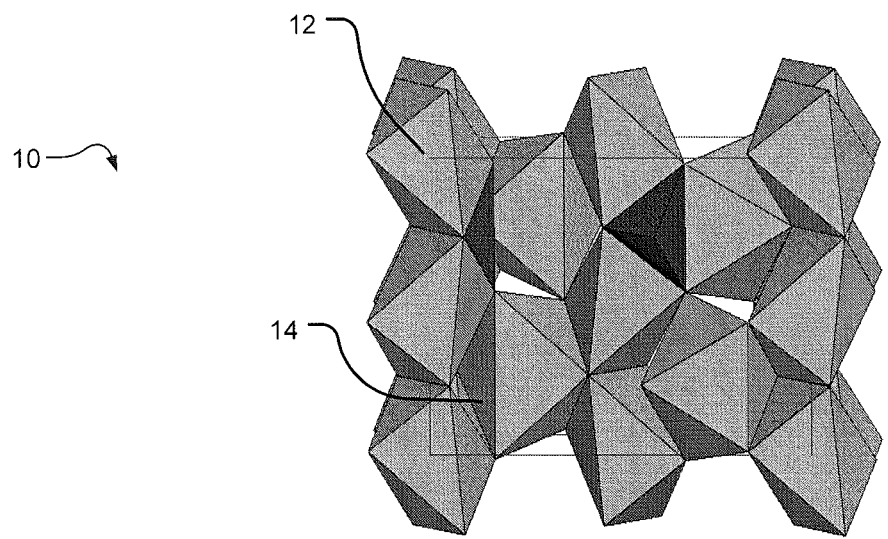
FIG. 1 depicts a lithium silicate according to various aspects of the present teachings.
Figure 2:
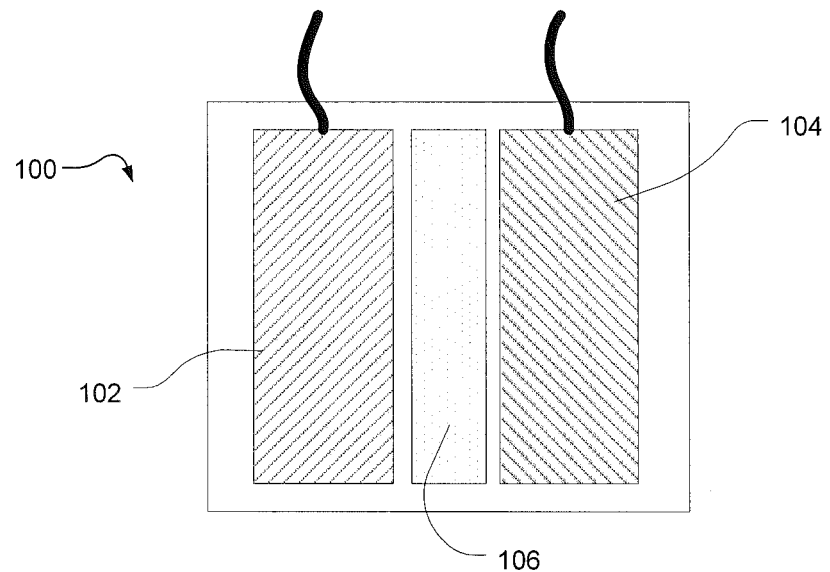
FIG. 2 depicts an exemplary battery.

With reference to FIG. 1, the present teachings generally relate to high-energy-density lithium-transition-metal-silicates. In various embodiments, the lithium-transition-metal-silicates are used as part of a battery 100 as generically depicted in FIG. 2. The battery 100 includes the anode 102, a cathode 104, and a separator 106 containing electrolyte. While the battery 100 of FIG. 2 is a simplified illustration, exemplary battery systems include lithium based batteries, sodium batteries, silicon based batteries, magnesium based batteries, calcium based batteries, as a component or framework for lithium-sulfur systems, and lithium-air systems. The electrode described in the present teachings can be used as a cathode in all lithium based batteries using metallic lithium or alternative anodes such as carbonaceous and graphitic anodes, lithium alloys, silicon based alloys, oxides, nitrides, phosphides, borides, and organic compounds.

The lithium-transition-metal-silicates of the present teachings help provide a marked increase in energy density and significant cost reduction with inherent safety, as compared with the current lithium ion technologies. This high energy storage system based on silicon chemistry is ideal and satisfies all requirements of the large format applications for electric-based transportation. Inherent advantages from the strong silicon-oxygen bonds and their chemical and electrochemical stability are also attributes of the silicate cathodes 102 of the present teachings.

Figure 4:
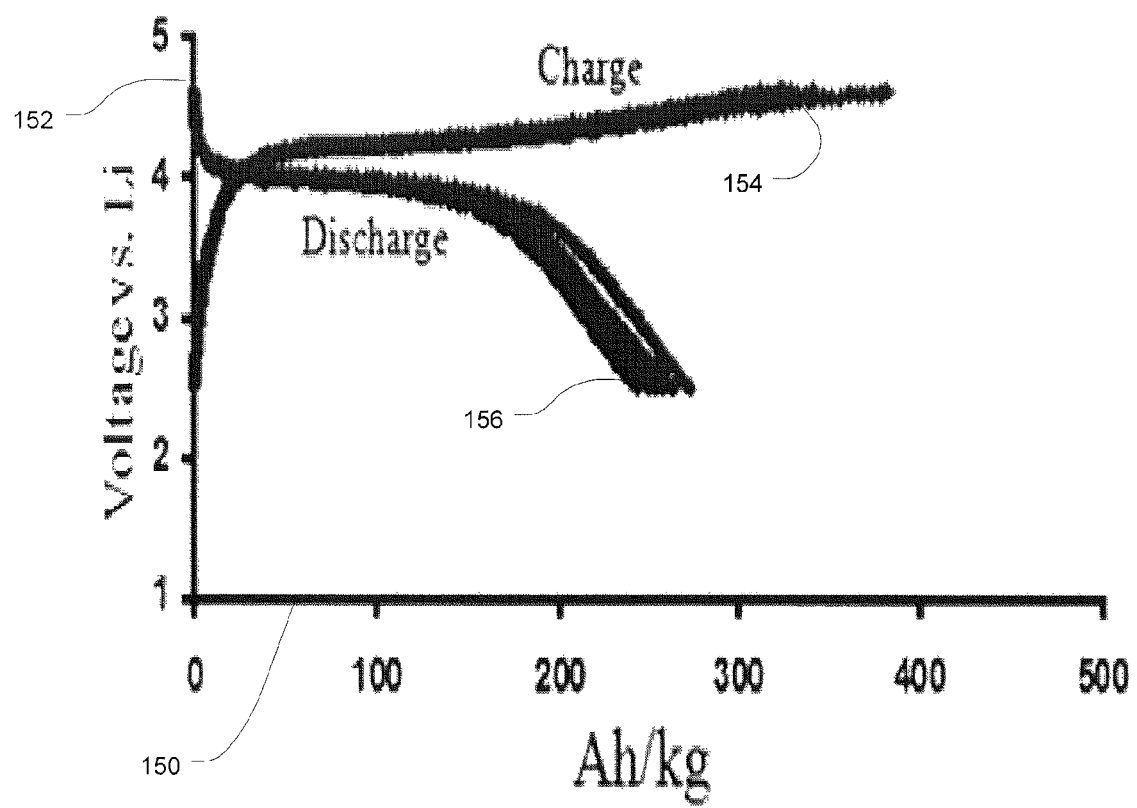
FIG. 4 depicts the voltage versus the lithium during the charge and discharge of a system according to various aspects of the present teachings.

Of the many benefits of the present teachings, notably, the instant silicate cathodes 102 help provide a battery chemistry with close to three times the capacity (mAh/g) of the current lithium-cobalt-oxygen ($LiCoO_2$) positive electrodes in a lithium cell. Current commercial positive electrode materials provide less than one electron per transition metal (LiCo(III)$O_2 \leftrightarrow Li_{1/2}Co(III/IV)O_2 + 1/2e^- + 1/2Li^+$), and are limited to less than 140 mAh/g. Silicate cathodes 104 offer two electrons/transition metal ($Li_2M(II)SiO_4 \leftrightarrow M(IV)SiO_4 + 2e^- + 2Li^+$) with theoretical capacity of 331 mAh/g and significantly lower cost than the current positive electrode technology. Further, it is believed that the silicate frameworks of the present teachings provide higher capacity than current phosphate-based positive electrodes such as lithium iron phosphate ($LiFePO_4$). Further lithium batteries including cathodes 102 of the present teachings have an increased voltage. In various embodiments and as shown in FIG. 4, the capacity (in mAh/g as represented by element 150 on the X-axis) reaches the theoretical value of 331 mAh/g when the voltage versus lithium is in the range of 2.5 to 4.5 (as represented by element 152 on the Y-axis). The pattern of the charge 154 and discharge 156 cycles both demonstrate the improved capacity and overall performance.

At the outset, a description of the materials is provided followed by a description of the methods of forming and using the materials.

Silicate Materials

In various embodiments, the cathode 104 includes a silicate material. The basic unit of silicates ($SiO_4$) is a tetrahedron shaped anionic group that includes a central silicon ion surrounded by four oxygen atoms to provide a structure that has a total charge of negative four (−4). The charge of the silicate facilitates of subsequent bonding of the silicate to an adjacent silicate tetrahedrons or to other ions or molecules. Silicates are rock forming minerals and are found in over 90% of the rock exposed on the earth's surface. As they are abundant and readily retrievable, silicates provide a low-cost alternative to existing cathode technologies. Silicates have a lower band gap than phosphates and may provide better electrical conduction.

Silicates are further categorized into additional groups, such as the Olivine group. The Olivine group includes lithium- and/or transition-metal-containing minerals Forsterite ($Mg_2SiO_4$), Fayalite ($Fe_2SiO_4$), Tephorite ($Mn_2SiO_4$), Liebenbergite ($Ni_2SiO_4$), Cobalt-olivine ($Co_2SiO_4$), $LiScSiO_4$, and the like as non-limiting examples.

In various aspects, the Olivines are isolated silicate tetrahedrals having cations in octahedral positions. As shown in FIG. 1, a generic Olivine structure having lithium ions in the M(I) octahedral positions is depicted. Further, FIG. 1 shows a schematic of an Olivine structure 10 with two distinct M1 (labeled on FIG. 1 as element 12) and M2 (labeled on FIG. 1 as element 14) octahedral sites. The tetrahedral site is where the silicate anions reside. There is a site preference for ions to reside in M1 and M2. It is believed that the ion mixing between M1 and M2 are temperature dependent.

The methods of the present teachings facilitate placement of the lithium ions in the M(I) octahedral position. It is understood that although select Olivine group silicates are detailed herein, other silicates are also useful in cathodes 104 of the present teachings such as Phenacite, Willemite, and Kyanite with the $SiO_5^{-6}$, dimer $Si_2O_7^{-6}$, $SiO_3^{-2}$, and any other silicate moiety, as well as single, double, and 3-D framework, as non-limiting examples. Silicate anions that share oxygen to form chain, ring, sheets, and 3-D frameworks are abundant in nature and are distinguished from the silicate containing isolated $SiO_4^{4-}$ moiety such as Olivine silicates.

In various embodiments, the lithium ion resides in the M(I) octahedral sites while a transition metal resides in M(II) octahedral sites. However, ion mixing between M(I) and M(II) will take place based on synthesis condition and temperature. This class of compounds, with general formula ($Li_2M(II)SiO_4$), allows extraction of two lithium ions per formula unit when the transition metal M(II) is oxidized to M(III) and M(IV). This reaction corresponds to the utilization of two electrons per transition metal, more than triple that in layered $LiMO_2$ in current lithium ion batteries such as batteries using $LiCoO_2$ and lithium nickelate based cathodes.

While it is believed that some of the lithiated transition metal silicates are electrochemically active, there have been difficulties in creating Olivine type structures of $M(I)M(II)SiO_4$ where the silicate tetrahedral remain isolated, and lithium ion in M(I) octahedral site and transition metals in M(II) octahedral sites of the silicate lattice. Previous attempts at synthesis using solid state, sol-gel and polyol processes have failed to create a lithium transition metal silicate with proper Olivine structure with Pnma space group. Therefore, the reported capacity of the silicate cathode has remained low (less than about 160 mAh/g), and with poor cyclability. The theoretical calculation demonstrated that within the Olivine structure, $Li_yMXO_4$ (where X=Ge, Si, As, or P and y is the number of lithium ions) the voltage of the positive electrode is directly related to the nature of transition metal and the electronegativity of the $XO_4$ negative electrodes. In addition to the electronegativity of the $XO_4$ negative electrodes, the voltage of these positive electrodes depends on the electronic nature of the transition metals, M.

In various embodiments, mixed transition metal silicates, with general formula $Li_2(M_xM'_{1-x})SiO_4$ (where M and M' are transition metals with various oxidation states) are also potential positive electrode materials. The exchange of Fe with Mn provides isostructure compounds with lattice symmetry. In various embodiments, the Pechini sol-gel process and solution based synthesis are suitable to prepare the mix-metal silicates. A full disclosure of the Pechini method is found in U.S. Pat. No. 3,330,697, which is incorporated herein by reference in its entirety. Other suitable methods of preparing the mix-metal silicates include microwave synthesis, hydrothermal synthesis, solid state synthesis, soft chemistry method, molten salt flux method, physical vapor deposition, chemical vapor deposition, and/or sputtering technique.

One of the major issues with Olivine silicate type synthesis has been extreme tendency of silicate anions to form chain, ring, sheets, and tunnels and agglomerate with lack of specificity in grain growth directions. The clustering of silicate tetrahedral anions to corner and edge share have made it difficult to make Olivine silicate with isolated silicate anions. In addition, the low electronic conductivity and agglomeration of the particles has inhibited full utilization of silicate based positive electrode.

Figure 3:
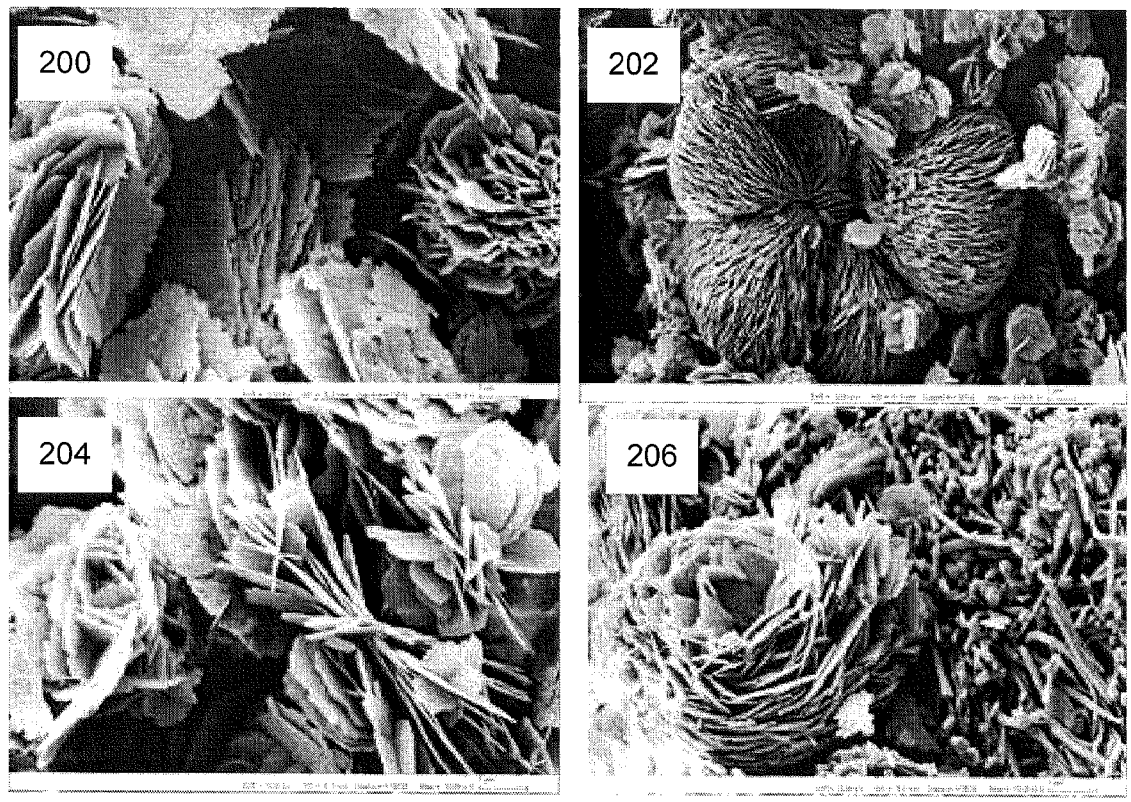
FIG. 3 depicts various flake arrangements of silicates according to various aspects of the present teachings.

With reference to FIG. 3, in various embodiments, the present teachings provide methods of producing Olivine silicates having various morphologies, including the depicted flake-like structures. It is believed that the flake-like structure maximizes surface area for the cathode 104 and thus provides the benefits detailed above herein. The maximized surface area provides greater access to a greater amount of the silicate as compared to a material that is in a granular or block form. In various embodiments, the flake-like sheets have a thickness of from about 1 to about 100 nanometers, including all sub-ranges. In still other embodiments, the flake-like sheets have a thickness of from about 2 to about 20 nanometers, including all sub-ranges. In still other embodiments, the flake-like sheets have a thickness of about 10 nanometers.

Still referring to FIG. 3, as shown at elements 200-206, the flake-like structures form distinct groups that are arranged together in close proximity. In some aspects the groups of flake-like structures are parallel to, perpendicular to, or at some other angle with respect to at least one other group of flake-like structures. In various aspects, the flakes are prepared in a direction perpendicular to the lattice b direction to expose the tunnel for easy lithium transport. In various aspects, the groups of flake-like structures are in physical contact, overlap, and/or are intertwined at a single point, at multiple points, on a single face or side, or along the entirety of the respective structures. The flake-like structures are arranged to form a plurality of stacked sheets, staggered sheets, and other shapes. The space between the sheets provides tunnels, interstices, or intricacies that facilitate passage of the ions in the silicate cathode 104 and provide the enhanced energy density and rate capability of the present teachings.

As clearly illustrated, some of the groups of flake-like structures are a flattened stack. Notably, at element 202, a plurality of clusters of the flake-like structures is combined to form almost a clover-like pattern. Turning to element 204, there are variations in the spacing between the various clusters. As best shown at element 206, in various aspects, the flake-like structures form an ornamental and arcuate shape where the flakes fan outwards from a central region. As a non-limiting example, the flake-like structures can mimic the shape of an opened or closed ordered shape of a flower, such as a rose or a more random shape, such as a feather duster. Still referencing element 206, there is a central region of the large rose-like shape that has a lower concentration of flake-like structures as compared to other regions. It is understood that the concentration of flake-like structures in any of the embodiments of the present teachings include a continuous, random, or graded concentrations of the flake-like structures across a cluster or across the entirety of the cathode 104.

Methods of Silicate Preparation and Cathode Formation

To provide the flake-like shape, the present teachings provide a tailored synthesis process where lithium is substituted into a formed silicate. The indirect approach to forming the lithium-substituted silicate is needed because the shape and size of lithium hinders proper alignment of the silicate to form the desired flake-like shapes of the instant teachings.

First, a silicate is obtained or prepared having the general formula $(AB)_2SiO_4$ (where A=calcium, magnesium, barium, or strontium, as non-limiting examples and B=manganese, iron, cobalt, nickel, or any other transition metal, such as iron or cobalt, as non-limiting examples). The formed metal silicate is exposed to a solution containing a high concentration of lithium ions. In various embodiments, the exposure is conducted at a temperature close to the melting point of the respective lithium salts. In various aspects this is a temperature that is from greater than about 0% to less than or equal to about 35% less than the melting point of the respective lithium salt, including all sub-ranges. The temperature is controlled to protect the lattice system of the formed silicate. If the temperature was too high and/or if the pressure was too low, the structure might collapse or have an undesired orientation that has limited suitability for select aspects of the instant teachings.

There is an ion exchange between the element selected for position A of the formula $(AB)_2SiO_4$, and the lithium ion displaces the other ion. For example, where calcium is used for position A, the lithium ions displace the calcium ions, and in turn the calcium ions precipitate or dissolve out into the ion exchange solution. In an embodiment where B is manganese and lithium is substituted for another metal, the resultant product is a single phase, pure $Li_2MnSiO_4$.

In still other embodiments, the resultant lithium-transition-metal-silicate is a mixed transition metal silicate with the general formula $Li_2(M(X)M'(1-X)SiO_4$, where M and M' are transition metals with various oxidation states indicated by the letter X. In various embodiments of mixed transition metal silicates that employ iron and manganese, the exchange of iron with manganese provides the isostructure compounds with lattice symmetry. In various embodiments, a Pechini sol-gel process and solution are used to prepare the mix-metal silicates.

In other aspects of the present teachings, to form the flake-like structure, a polyalcohol process or displacement reaction with silicic acid and silicone oils are used as the media of formation. Suitable polyalcohols according to the present teachings include any material include at least two hydroxyl constituent groups. The silicone oil may include precursors containing silicon connected to four oxygen ions. It is understood that substituted and unsubstituted polyalcohols are suitable for the present teachings. Exemplary polyalcohols include glycols such as diethyl alcohol, dipropyl alcohol, butyl alcohol, and the like, as non-limiting examples. It is believed that decreasing the molecular weight of the glycols provides flake-like sheets that are smaller in at least one dimension (thickness, length, and/or width) as compared to the flake-like sheets prepared with a glycol having a higher molecular weight. It is understood that use of a combination of polyalcohol is also within the scope of the present teachings. For example, a silicate cathode 104 can be tailored to have an even greater variety between the flake-like sheets and the clusters formed from the sheets by combining different polyalcohols.

In still other embodiments, the flake-like structures are formed by compressing the lithium-containing silicate in a solid-state or under dry conditions. As detailed above, the lithium ion exchange is still conducted. Instead of using the polyalcohol to direct orientation of the sheets, mechanical techniques and apparatuses are employed.

Regardless of whether solid-state or polyalcohol formation is used, the single phase, pure $Li_2MnSiO_4$ is in the desired orientation for aspects of the present teachings. Further, the silicate sheets provide lithium diffusion tunnels that are perpendicular to the silicate sheet directions. This dramatically improves lithium transport or diffusion of lithium ions through the cathode 104.

The cathode 104 is formed by casting the flake-like sheets onto a substrate. In various embodiments, the substrate is a carbon paper. The substrate can be pre-formed in the shape of the cathode 104 or the substrate can be cut to size after the silicate is disposed thereon. In other embodiments, the silicate materials are formed into a mat with carbonaceous fibers and used without an underlying substrate. It is understood that caution is used with the materials as to not disrupt the crystalline structure of the silicates. The above-detailed benefits of the cathode are further magnified when the cathode is formed on a paper-type electrode without the use of an aluminum current collection. In various embodiments, the present teachings include forming the cathode 104 of a free-standing carbon paper coated with silicates of the present teachings. The cathode 104 is then incorporated into the appropriate battery as is known in the art.

Subsequent to formation of the flake-like sheets, the silicate sheets are coated with a conductive carbon, through gas phase reaction, to improve their rate capability. All sources of conductive carbon are suitable in various aspects of the present teachings. The elemental doping of the silicate with rare-earth elements at the level of less than 2% also has improved the electronic conductivity of the sheet silicate by 200-fold. Furthermore, common coating and doping processes used for non-conductive positive electrodes (such as carbon coating and doping with rare earth elements) are applicable to the silicate based positive electrodes.

In summary, in various aspects, silicate based positive electrodes were synthesized in presence of carbonaceous particulates and conductive carbon fibers to enhance electrical conductivity. The carbonaceous materials are used as a conductive support during formation of initial silicates. Subsequent to formation of Olivine silicate ion exchange with lithium salts was performed to prepare lithiated transition metal silicates. In various embodiments, the present teachings provide methods of preparing a silicate cathode for a lithium ion battery. An Olivine structure having a flake-like structure is prepared. The Olivine structure is coated with carbon. The Olivine structure is shaped for use as part of a cathode. In various aspects, preparing the Olivine structure having a flake-like structure further includes preparing an Olivine silicate having the structure $(AB)_2SiO_4$, where A is a metal and substituting lithium for the metal. An ion exchange is optionally performed to substitute lithium for the metal.

In select aspects, preparing the Olivine structure having a flake-like structure further includes forming the Olivine structure into sheets in the presence of at least one of silicic acid, a silicone oil, and an alcohol. The Olivine structure may be doped with from about 1% to about 2% of a rare-earth metal. In other aspects, clusters are prepared of the flake-like structures. In such aspects, the clusters are oriented to provide tunnels for lithium ion diffusion between the flake-like structures. The flake-like structures have a thickness of from about 1 nanometer to about 20 nanometers. A free standing film made of a carbon fiber paper coated with the silicate is prepared in various aspects.

In still other aspects of the present teachings, methods of preparing a silicate cathode for a lithium ion battery is provided. A mixed transition metal silicate is prepared to have a flake-like structure. The mixed transition metal silicate is coated with carbon. The mixed transition metal silicate is shaped for use as part of a cathode. The mixed transition metal silicate has the general formula of $Li_2M(X)M'(1-X)SiO_4$, where M and M' are transition metals with various oxidation states.

In various aspects, an ion exchange is conducted of at least one of the transition metals M and M'. A Pechini sol-gel process and solution are used to prepare the mixed transition metal silicate in certain aspects. Another feature is that preparing the flake-like structure further includes forming the mixed transition metal silicate into sheets in the presence of at least one of an alcohol, a silicone oil, and silicic acid. In yet other aspects, the silicate is doped with from about 1% to about 2% of a rare-earth metal. In other embodiments, the sheets are formed in a direction to the lattice b direction of the silicate. In still other aspects, clusters of the flake-like structures are prepared so that they are oriented to provide tunnels for lithium ion diffusion between the flake-like structures. In still other aspects, the flake-like structures have a thickness of from about 1 nanometer to about 20 nanometers.

In yet other embodiments of the present teachings, methods of increasing voltage in a lithium ion battery are provided by distributing lithium ions in a plurality of spaces formed between flake-like silicate materials combined to form a region of a cathode. In certain features, a free standing film including a carbon fiber paper coated with a flake-like silicate material is prepared. Transition metals are included in the silicate in various aspects. The concentration of the transition metals is varied in other aspects.

EXAMPLES

Silicate based positive electrodes were synthesized using unique preparation methods to form the proper particle crystal structure, composition, size and morphology (platelet with optimized $Li^+$ diffusion pathway). Among the various silicate structures, those with proper ratios of mixed metal/$SiO_4$ ($Li_2MSiO_4$, M=mixed multi-redox transition metal centers) were synthesized to further enhance their energy storage capacity and maximize the number of redox electron exchanges and the available sites for lithium ions. The voltage profile of the silicate was tuned by proper selection of mixed transition metals, lattice parameters, and silicate anion packing density. By using a polyol process with a low cost surfactant, a single phase, pure $Li_2MnSiO_4$ with rose-flower geometry, having thin sheet layer silicate with sheet thickness of about 10 nanometers was created. The scanning electron microscopy (SEM) results favored flake-like structures.

The electrical and ionic conductivity of the silicate positive electrodes was studied at various states of lithiation using embedded four probe and blocking electrode techniques. Impurity bands close to the conduction band of the silicate were created by addition of less than 2% niobium which increased the electronic conductivity of the silicate over 220-fold. The electronic and ionic conductivity of the silicate positive electrode by doping, substitution, and coating processes was improved. Surface coatings by carbonaceous material and addition of conductivity enhancers in the electrode plates was also used to generate almost metallic type electrode with low impedance for high rate, (high power) applications.

Several synthesis processes were developed and refined for preparing lithium transition metal silicates. The solid state reaction synthesis provided a phase pure silicate with particle size in the range of 10-20 microns with a few larger particulates (60-70 microns). The crystallite sizes within the secondary particles were about 2.5 nanometers. After energetic ball milling of the sample, the secondary particle sizes were reduced to 0.1-0.2 microns. The ball milling was also performed in presence of conductive carbon, and in wet condition in xylene medium. The electrochemical performance of the materials prepared by simple solid-state reaction was measured. Some improvements on capacity and reversibility were observed after particle size reduction and application of carbon coating (120 mAh/g).

A hydrothermal synthesis was also applied, and phase pure materials for all $Li_2MSiO_4$ (M=iron (Fe), manganese (Mn), nickel (Ni), and cobalt (Co)) were prepared after ion exchange with lithium salt. The electrochemical performance of the hydrothermal samples was improved and exceeded 1.4 electrons per transition metal atom. The polyol synthesis provided the best results and gave more flexibility to adjust the morphology of the silicate products.

The polyol-based process in the presence of surfactants caused preferred directional growth to provide a flake-type morphology with preferred directional grain growth. The electrochemical performance, for the sheet like silicate with about 10 nanometer sheet thickness, improved to over 1.7 electrons per transition metals after carbon coating.

Referring to FIG. 3, the morphology of $Li_2MnSiO_4$ prepared using different surfactant in polyol synthesis method is depicted. The flake-like sheets had proper orientation to facilitate lithium transport in and out of the 1-D tunnel of lithium transition metal silicates. The capacity of samples shown at element 202 were improved from 167 mAh/g for a-type sample to 293 mAh/g.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of preparing a silicate cathode for a lithium ion battery comprising:
preparing an Olivine structure $(AB)_2SiO_4$ that has a flake structure, wherein A is a metal and B is a transition metal, and substituting lithium for A;
carbon coating the Olivine structure; and
shaping the Olivine structure for use as part of a cathode.

2. The method of claim 1, further comprising performing an ion exchange to substitute lithium for A.

3. The method of claim 1, wherein preparing the Olivine structure having a flake structure further comprises forming the Olivine structure into sheets in the presence of at least one of silicic acid, silicone oil, and an alcohol.

4. The method of claim 1, further comprising doping the Olivine structure with from about 1% to about 2% of a rare-earth metal.

5. The method of claim 1, further comprising preparing clusters of flake structures, wherein the clusters fan outwards from a central region.

6. The method of claim 5, wherein the clusters are oriented to provide tunnels for lithium ion diffusion between the flake structures.

7. The method of claim 1, wherein the flake structures have a thickness of from about 1 nanometer to about 20 nanometers.

8. The method of claim 1, further comprising forming a free standing film comprising a carbon fiber paper coated with the Olivine structure.

9. A method of preparing a silicate cathode for a lithium ion battery comprising:
preparing an Olivine silicate having the structure $(AB)_2SiO_4$, wherein A is a metal and B is a transition metal, and wherein the Olivine silicate is structured in clusters of sheets so to allow for the distributing of lithium ions;
performing an ion exchange to substitute lithium for A;
carbon coating the Olivine structure; and
shaping the Olivine structure for use as part of a cathode.

10. The method of claim 9, wherein the clusters of sheets form an arcuate shape having the clusters of sheets fanning outwards from a central region.

11. The method of claim 9, wherein preparing the Olivine structure further comprises forming the Olivine silicate into sheets in the presence of at least one of silicic acid, silicone oil, and an alcohol.

12. The method of claim 9, further comprising doping the Olivine silicate with from about 1% to about 2% of a rare-earth metal.

13. The method of claim 9, further comprising preparing clusters of flake structures, wherein the clusters fan outwards from a central region.

14. The method of claim 13, wherein the clusters are oriented to provide tunnels for lithium ion diffusion between the flake structures.

15. A method of preparing a silicate cathode for a lithium ion battery comprising:
preparing sheets of Olivine silicate flake structures radiating centrally having the structure $(AB)_2SiO_4$, wherein A is a metal and B is a transition metal, and substituting lithium for A;
carbon coating the Olivine structure; and
shaping the Olivine structure for use as part of a cathode.

16. The method of claim 15, further comprising performing an ion exchange to substitute lithium for A.

17. The method of claim 16, wherein preparing the Olivine structure having a flake structure further comprises forming the Olivine structure into sheets in the presence of at least one of silicic acid, silicone oil, and an alcohol.

18. The method of claim 15, further comprising doping the Olivine structure with from about 1% to about 2% of a rare-earth metal.

19. The method of claim 15, further comprising preparing clusters of flake structures, wherein the clusters fan outwards from a central region.

20. The method of claim 19, wherein the clusters are oriented to provide tunnels for lithium ion diffusion between the flake structures.

* * * * *